Patented Dec. 17, 1946

2,412,720

UNITED STATES PATENT OFFICE 2,412,720

SPRAY COMPOSITIONS

Clarence D. Dolman, Wenatchee, Wash., assignor to Hercules Glue Company, Ltd., a corporation of California No Drawing. Application April 11, 1944, Serial No. 530,552

8 Claims. (Cl. 167—42)

1

This is a continuation in part of my application Serial Number 338,371 filed June 1, 1940, and my application Serial Number 399,229 filed June 21, 1941, now Patent Number 2,346,362 of April 11, 1944.

In my previous Patent 2,195,696 issued April 2, 1940, I disclose a successful spray composition made up of water, free oil, a plant protectant and certain fatty acid materials. The invention was particularly disclosed as applied to finely divided solid substantially water insoluble inorganic metal salt insecticides. However, the statement was made in that patent that the invention was useful for application of finely divided substantially water insoluble solid organic plant protectants. Some time after issuance of the patent I found that this statement was in error, and accordingly application was promptly made for reissue thereof, this being effected with the issuance of Reissue Patent No. 22,340 on July 6, 1943.

The present invention is concerned with application of finely divided solid substantially water insoluble organic plant protectants to plants and fruits to protect them against plant pests. I have found that to apply organic plant protectants successfully it is essential that the spray composition include a small quantity of a water soluble salt of a metal having a valence of at least two. Examples of these salts are zinc sulphate, alum, ferric sulphate and manganese sulphate. All of these have been employed with success, zinc sulphate being preferred. Aluminum chloride, ferric chloride, zinc chloride and aluminum sulphate can also be employed.

The compositions of my aforementioned patents include oil as an essential component. I have found that with organic protectants of the class dealt with herein, oil can be omitted and is not an essential component of the spray composition. In some cases it enables better sticking to fruit to be secured, increasing flocculation in the tank. Of course, with some organic protectants oil is not compatible and is therefore omitted.

It is in general the object of the invention to provide for spraying of organic protectants on fruit and vegetation to the end that a heavy, uniform, flexible cover can be provided.

The invention has other objects and features which will be apparent upon a consideration of the following more detailed explanation of the invention.

Briefly and concisely the spray composition of the present invention includes water, an effective

2 concentration of the organic protectant, the metal salt and a small quantity of one or more materials which for convenience I will term flocculating materials and which are designated or identified as a fatty acid, a fatty acid ester, a fatty acid soap, a partially esterified fatty acid, a partially saponified fatty acid, an ester of a petroleum sulfonic acid, a soap of a petroleum sulfonic acid, a partially esterified petroleum sulfonic acid, a partially saponified petroleum sulfonic acid, a naphthenic acid, an ester of a naphthenic acid, a soap of a naphthenic acid, a partially saponified naphthenic acid, a partially esterified naphthenic acid, a rosin acid ester, a rosin acid soap, a partially esterified rosin acid and a partially saponified rosin acid.

The spray composition of the present invention is made up by adding the several components to the spray tank. Proceeding on the basis of 100 gallons of water, a portion of this is usually first added to the tank, about 15 to 20 gallons, and the agitator is then rotated. This is desirable because of the small concentrations employed. To the spray tank is also added a small quantity of a water soluble salt of a metal having a valence of at least two, preferably zinc sulphate. Usually between about 4 grams and 4 ounces of this salt suffices. The desired concentration of the organic plant protectant is then added. This can be any of the finely divided solid, substantially water insoluble organic materials effective as an insect repellant, contact poison, a stomach poison, a fungicide or ovicide, such as any one of the finely divided fish poison materials including derris, cube, and like materials, the various proprietary nicotine-bentonite compositions, as well as relatively pure organic compounds such as xanthone, phenothiazine, or any one of the materials disclosed in the Muller Patent No. Re. 22,700. The materials of the Muller patent are known in the trade as "DDT" and they will be referred to hereinafter in this manner. The quantity of protectant can vary between about one half pound to four pounds to each 100 gallons of water.

One or more flocculating materials are also added. The quantity added should be such as to give the desired degree of sticking on the fruit or vegetation. This quantity can vary; for example with a half pound of a protectant one can use an equal weight and even more of the flocculating material. However, one can decrease this quantity to as little as 1.5 ounces but 3 ounces is usually preferred. This last quantity will suffice for even four pounds of protectant. As little as about 5% of the flocculating material on the weight of the protectant can be added, particularly when the latter is present in a fairly sizable concentration. The quantity of flocculating material is determined by the degree of flocculation desired and sufficient should be added to ensure attainment of this end.

When the spray tank agitator is operated, it will be found that the organic protectant is in a flocculated condition in the water. The balance of the water is then added to complete the composition. The composition should have a pH between 5 and 9, and preferably between 6 and 8.

The presence of the water soluble salt of a metal having a valence of at least two is essential to practice of the present invention, for unless this material be supplied, flocculation of the organic protectant will not be sufficient and the material will not be properly flocculated in the spray composition. Such a small quantity of the water soluble salt is required that its effect is almost catalytic. However, the effect is immediately noticeable for when the metal salt is present and when the composition is sprayed, a heavy cumulative deposit is secured on the vegetation and fruit.

The following compositions are illustrative of a practice of the present invention and are set forth by way of example, not by way of limitation:

| | | |
|---|---|---|
| Water | gallons | 100 |
| Xanthone | ounces | From 8 to 64 |
| Substantially neutral soap | ounces | 8 |
| Zinc sulphate | do | 6 |
| Kerosene | pints | ½ to 2 |

The foregoing mixture was agitated in a spray tank. It was sprayed on apple trees and provided a smooth, continuous cover on the fruit. Inclusion of the kerosene is not essential and the protectant can be applied successfully without the oil.

Another composition was made up as follows and, when sprayed, gave good control over red spider on apples.

| | | |
|---|---|---|
| Water | gallons | 100 |
| Dinitro-orthocyclohexolphenol | ounces | 12 |
| A water soluble petroleum sulfonic salt preparation made up after the disclosure of Patent 1,922,607 | ounces | 1 |
| Substantially neutral soap | do | 2 |
| Zinc sulfate | do | ½ |

A pint of kerosene can be included in the above composition if desired.

Another composition was made up as follows:

| | | |
|---|---|---|
| Water | gallons | 100 |
| Dichlorodiphenyl - trichloroethane | pounds | 2 |
| Oleic acid-soap | ounces | 3 |
| Zinc sulfate | do | ½ |

This flocculated and sprayed effectively.

It is an advantage and a feature of this invention that oil need not be present for successful application of the protectants. However, as an oil, one can employ any suitable animal, vegetable or mineral oil, usually one having a viscosity of about that of kerosene to about 120 seconds Saybolt. Such oils are provided by kerosene, China-wood, soya bean, olive, linseed, cottonseed and like oils, or a fish oil, preferably a nondrying one, or the various petroleum fractions cut to provide a suitable oil. The oil employed is preferably a liquid; if it is a solid at ordinary temperatures, it can be dissolved in a suitable solvent and thus liquefied and employed providing the solvent is compatible with the other constituents. The quantity of oil required is usually quite small, between ½ pint to a gallon per 100 gallons of water. To ensure the benefits of oil, it is essential that the oil be available in a free form so that it can oil wet the organic plant protectant. If one adds an oil emulsion of the type disclosed in the Knight Patent 2,190,173, the Lindstaedt Patent 2,210,420, or the Volck Patents 1,922,607 and 2,056,238, it is necessary first to destroy the oil emulsion to release the emulsified oil so that it is in free form and to destroy the emulsifying agent if this interferes with flocculating the protectant.

I claim:

1. A spray composition consisting essentially and proportionately of about 100 gallons of water, an effective concentration of a finely divided substantially water insoluble solid organic plant protectant suspended in the water, a small quantity of a water soluble salt of a metal having a valence of at least two, and sufficient of a material selected from the group consisting of a fatty acid, a fatty acid ester, a fatty acid soap, a partially esterified fatty acid, a partially saponified fatty acid, a petroleum sulfonic acid, an ester of a petroleum sulfonic acid, a soap of a petroleum sulfonic acid, a partially esterified petroleum sulfonic acid, a partially saponified petroleum sulfonic acid, a naphthenic acid, an ester of a naphthenic acid, a soap of a naphthenic acid, a partially saponified naphthenic acid, a partially esterified naphthenic acid, a rosin acid ester, a rosin acid soap, a partially esterified rosin acid and a partially saponified rosin acid to flocculate the protectant in said composition in the presence of said salt, the composition having a pH between 5 and 9.

2. A spray composition consisting essentially and proportionately of about 100 gallons of water, from about one half to about four pounds of a finely divided substantially water insoluble solid organic plant protectant suspended in the water, between about four grams and about four ounces of a water soluble salt of a metal having a valence of at least two, a material selected from the group consisting of a fatty acid, a fatty acid ester, a fatty acid soap, a partially esterified fatty acid, a partially saponified fatty acid, a petroleum sulfonic acid, an ester of a petroleum sulfonic acid, a soap of a petroleum sulfonic acid, a partially esterified petroleum sulfonic acid, a partially saponified petroleum sulfonic acid, a naphthenic acid, an ester of a naphthenic acid, a soap of a naphthenic acid, a partially saponified naphthenic acid, a partially esterified naphthenic acid, a rosin acid ester, a rosin acid soap, a partially esterified rosin acid and a partially saponified rosin acid, the material being present in an amount from about the weight of the protectant to about 5% of the weight of the protectant and being sufficient to flocculate the protectant, the composition having a pH between 5 and 9.

3. A composition as in claim 1 wherein the metal salt is zinc sulphate.

4. A composition as in claim 2 wherein the metal salt is zinc sulphate.

5. A composition as in claim 1 wherein the metal salt is aluminum sulphate.

6. A composition as in claim 2 wherein the metal salt is aluminum sulphate.

7. A spray composition consisting essentially and proportionately of about 100 gallons of water, an effective concentration of a finely divided substantially water insoluble solid organic plant protectant, said organic plant protectant being substantially uniformly dispersed on a finely divided water insoluble solid carrier therefore, a small quantity of a water soluble salt of a metal having a valence of at least two, and sufficient of a material selected from the group consisting of a fatty acid, a fatty acid ester, a fatty acid soap, a partially esterified fatty acid, a partially saponified fatty acid, a petroleum sulfonic acid, an ester of a petroleum sulfonic acid, a soap of a petroleum sulfonic acid, a partially esterified petroleum sulfonic acid, a partially saponified petroleum sulfonic acid, a naphthenic acid, an ester of a naphthenic acid, a soap of a naphthenic acid, a partially saponified naphthenic acid, a partially esterified naphthenic acid, a rosin acid ester, a rosin acid soap, a partially esterified rosin acid and a partially saponified rosin acid to flocculate the protectant in said composition in the presence of said salt, the composition having a pH between 5 and 9.

8. A spray composition consisting essentially and proportionately of about 100 gallons of water, from about one half to about four pounds of a finely divided substantially water insoluble solid organic plant protectant, said organic plant protectant being substantially uniformly dispersed on a finely divided water insoluble solid carrier therefore, between about four grams and about four ounces of a water soluble salt of a metal having a valence of at least two, a material selected from the group consisting of a fatty acid, a fatty acid ester, a fatty acid soap, a partially esterified fatty acid, a partially saponified fatty acid, a petroleum sulfonic acid, an ester of a petroleum sulfonic acid, a soap of a petroleum sulfonic acid, a partially esterified petroleum sulfonic acid, a partially saponified petroleum sulfonic acid, a naphthenic acid, an ester of a naphthenic acid, a soap of a naphthenic acid, a partially saponified naphthenic acid, a partially esterified naphthenic acid, a rosin acid ester, a rosin acid soap, a partially esterified rosin acid and a partially saponified rosin acid, the material being present in an amount from about the weight of the protectant to about 5% of the weight of the protectant and being sufficient to flocculate the protectant, the composition having a pH between 5 and 9.

CLARENCE D. DOLMAN.